July 31, 1956 — H. E. TEMPLE — 2,757,049
FLOUR VALVE
Filed June 5, 1952 — 2 Sheets-Sheet 1
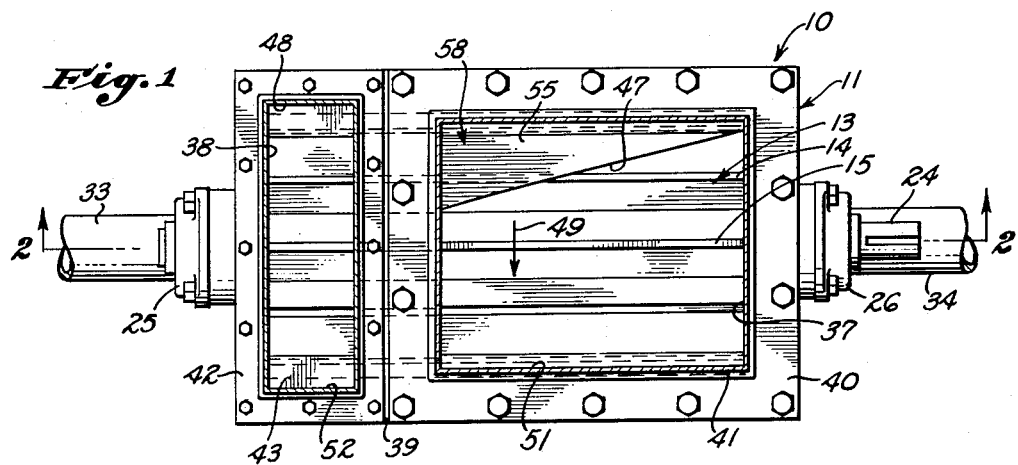
Fig. 1
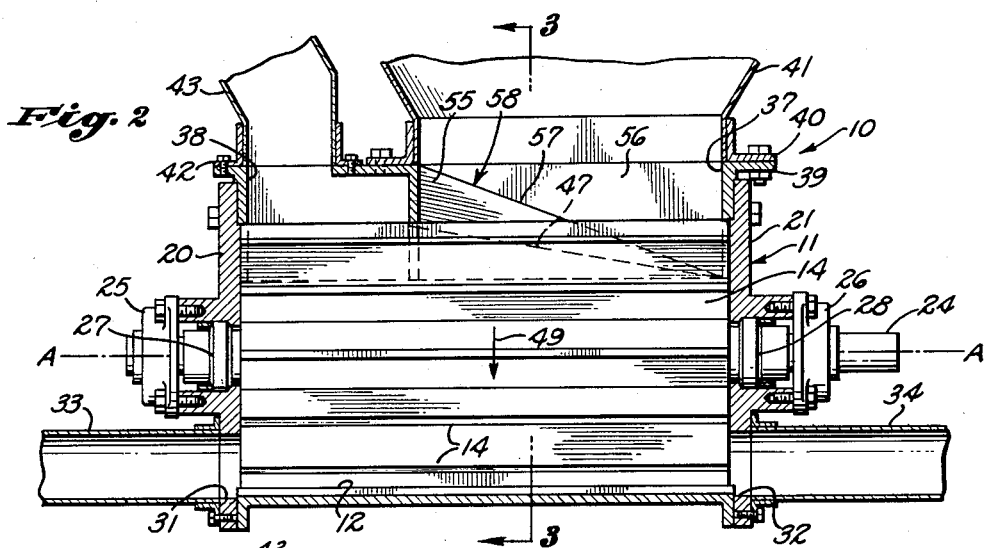
Fig. 2
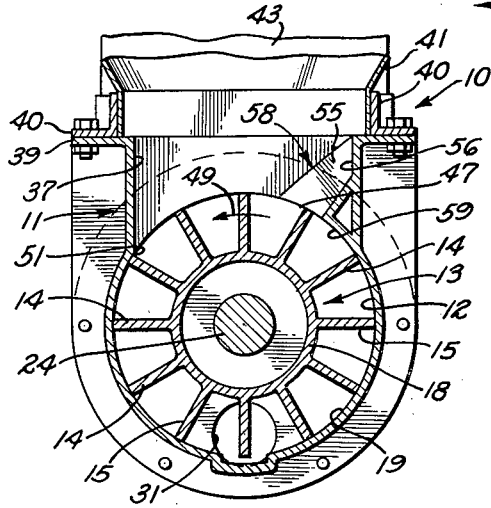
Fig. 3
INVENTOR:
HIRAM E. TEMPLE
BY HIS ATTORNEYS
HARRIS, KIECH, FOSTER & HARRIS July 31, 1956  H. E. TEMPLE  2,757,049
FLOUR VALVE
Filed June 5, 1952  2 Sheets-Sheet 2
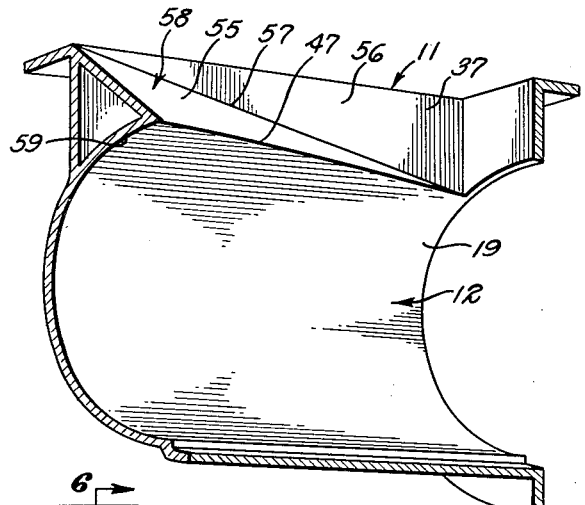
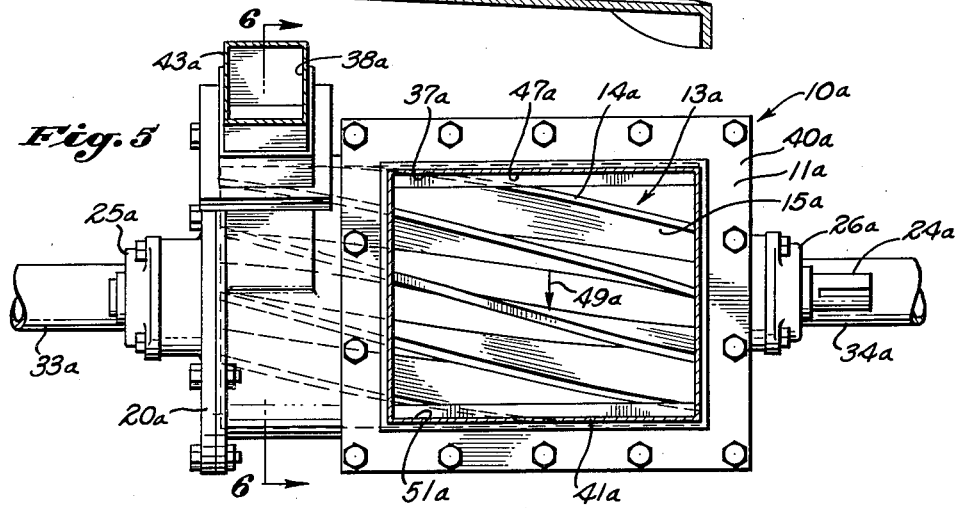
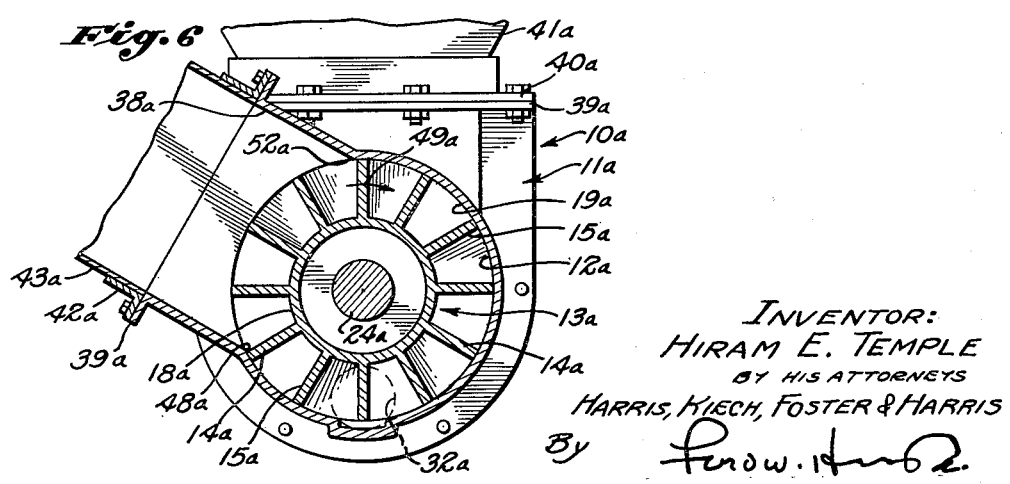
INVENTOR:
HIRAM E. TEMPLE
BY HIS ATTORNEYS
HARRIS, KIECH, FOSTER & HARRIS

United States Patent Office 2,757,049
Patented July 31, 1956

2,757,049

FLOUR VALVE

Hiram E. Temple, San Gabriel, Calif., assignor to Read Standard Corporation, a corporation of Delaware Application June 5, 1952, Serial No. 291,896

7 Claims. (Cl. 302—49)

The present invention relates in general to valves and, more particularly, to valves for use in pneumatic systems for conveying materials of various types, and especially such finely divided materials as flour, cement, and the like. Valves are employed at various points in such conveyor systems. For example, valves are employed to regulate the flow of materials from storage bins into pneumatic conveyor ducts or tubes and the present invention will be considered in such connection herein as a matter of convenience, although not limited thereto.

Since the present invention finds particular utility in the milling and baking industries for regulating the flow of flour from storage bins into pneumatic conveyor ducts, such an application of the invention will be considered hereinafter for purposes of illustration, again without limiting the invention thereto.

One conventional flour valve includes a rotor having a plurality of radial vanes providing a plurality of intervane spaces, and includes a housing having therein a chamber containing the rotor. Flour is delivered to successive intervane spaces through a supply opening which may communicate with a storage bin, or the like, successive intervane spaces registering with the supply opening as the rotor rotates. The housing is also provided with inlet and outlet ports respectively communicating with opposite ends of the rotor chamber and with opposite ends of successive ones of the intervane spaces as the rotor rotates in the chamber, the inlet and outlet ports being spaced circumferentially from the supply opening. Thus, after each intervane space is filled with flour from the supply opening, it moves its contents circumferentially around the rotor chamber until the ends thereof register with the inlet and outlet ports. Air under pressure is continuously supplied to the inlet port so that, as each flour-containing intervane space registers with the inlet and outlet ports, air flows through the intervane space from the inlet port to the outlet port and carries the flour along with it into an outlet conveyor duct communicating with the outlet port. Thus, as successive flour-containing intervane spaces are moved circumferentially of the rotor chamber into communication with the inlet and outlet ports, the contents thereof are propelled, by the air stream delivered to the inlet port, through the outlet port into the outlet duct, which leads to a suitable point of use or disposal.

As the flour-containing intervane spaces are emptied by the air stream in this manner, air under pressure is trapped therein and, unless this pressure is released before the spaces again communicate with the supply opening, it is either released into the storage bin with which the supply opening communicates, or it prevents the admission of additional flour if the depth of the flour in the storage bin is sufficient to serve as a seal. In the first case, the flour in the storage bin becomes so aerated that the capacity of the valve is diminished, and, in the second case, the capacity of the valve may be diminished to zero. It is conventional practice to vent the intervane spaces to the atmosphere at a point intermediate the inlet and outlet ports on the one hand and the supply opening on the other, which partially avoids the foregoing problems, but which nevertheless results in the trapping of air at atmospheric pressure in the intervane spaces to diminish the capacity of the valve since such air under atmospheric pressure cannot escape readily through the flour in the storage bin.

A primary object of the present invention is to provide a valve of the foregoing general character which obviates the disadvantages discussed above.

More particularly, a primary object of the invention is to provide a valve having means for venting all of the air from the intervane spaces, i. e., the air under atmospheric pressure as well as that under superatmospheric pressure, as the intervane spaces are filled through the supply opening so that the intervane spaces may be substantially completely filled with flour. The result of this is that the valve of the invention operates at maximum capacity at all times, which is an extremely important feature. As an example, I have found that the valve of the invention is capable of passing flour at a rate several times that of the conventional valve discussed above wherein the air at superatmospheric pressure is vented to the atmosphere at a point between the inlet and outlet ports on the one hand and the supply opening on the other.

Still more specifically, an important object of the invention is to provide a valve having a housing which is provided with supply and vent openings respectively communicating with opposite ends of the rotor chamber and with opposite ends of successive ones of the intervane spaces as the rotor rotates in the chamber.

Another important object of the invention is to provide a valve wherein one end of each intervane space is in communication with the supply opening while the other end thereof is in communication with the vent opening, but wherein said other end of each intervane space communicates with the vent opening before said one end thereof communicates with said supply opening to permit the release of all air at superatmospheric pressure before communication with the supply opening is established.

Still another important object of the invention is to provide a valve wherein that end of each intervane space which is farthest from the vent opening is placed in communication with the supply opening first and wherein communication between each intervane space and the supply opening is established progressively in a direction toward the vent opening. With this construction, flour first enters that end of each intervane space which is farthest from the vent opening and then gradually fills the space in a direction toward the vent opening so that the air under atmospheric pressure in the space is progressively displaced toward the vent opening as the space is filled with flour. Consequently, substantially all of the air under atmospheric pressure, as well as all of the air under superatmospheric pressure, is displaced from the intervane spaces as they are filled with flour so that the intervane spaces may be substantially completely filled with flour, thereby utilizing the maximum capacity of the valve, which is an important feature of the invention.

Another object is to provide the supply opening with a leading edge which is traversed by successive intervane spaces as the latter moves circumferentially of the rotor chamber into communication with the supply opening, and to provide a structure wherein the leading edge of the supply opening makes acute angles with the intervane spaces, the acute angles facing the end of the rotor chamber which is farthest from the vent opening so that the intervane spaces communicate progressively with the supply opening in a direction toward the vent opening as discussed above.

Another object is to provide a valve wherein the intervane spaces are parallel to the axis of rotation of the

3 rotor and wherein the leading edge of the supply opening is inclined with respect to such axis of rotation.

Still another object is to provide a valve wherein the intervane spaces are inclined with respect to the axis of rotation of the rotor and wherein the leading edge of the supply opening is parallel to said axis of rotation.

The foregoing objects and advantages of the present invention, together with various other objects and advantages thereof which will become apparent, may be attained with the exemplary embodiments of the invention which are illustrated in the accompanying drawings and which are described in detail hereinafter. Referring to the drawings:

Fig. 1 is a plan view of a valve which embodies the invention;

Fig. 2 is a longitudinal sectional view of the valve which is taken along the arrowed line 2—2 of Fig. 1;

Fig. 3 is a transverse sectional view of the valve which is taken along the arrowed line 3—3 of Fig. 2;

Fig. 4 is a fragmentary perspective view of a portion of the valve illustrated in Figs. 1 to 3;

Fig. 5 is a plan view of another embodiment of the invention; and

Fig. 6 is a sectional view taken along the arrowed line 6—6 of Fig. 5.

Referring to Figs. 1 to 4 of the drawings, illustrated therein is a valve 10 which embodies the invention and which includes a housing 11 having therein a chamber 12 for a rotor 13, the latter being cylindrical in the particular construction illustrated and being rotatable about the axis A—A. The rotor 13 includes a plurality of radial vanes 14 which extend from one end of the rotor to the other and which provide a plurality of intervane spaces 15, the vanes being parallel to the axis of rotation A—A, in the embodiment under consideration. The vanes 14 are carried by a hub 18 and the outer edges of the vanes slidably engage the peripheral wall 19 of the rotor chamber 12 while the ends of the vanes and the hub respectively engage end walls 20 and 21 with sliding contact. The hub 18 of the rotor 13 is mounted on a shaft 24 which is carried by bearings 25 and 26 mounted on the end walls 20 and 21, respectively, the end walls being detachable from the body of the housing 11 in the particular construction illustrated and being bolted, or otherwise secured thereto. Seals 27 and 28 are disposed between the respective bearings 25 and 26 and the rotor chamber 12 to keep the flour, or other material being handled by the valve, out of the bearings.

The housing 11 is provided with inlet and outlet ports 31 and 32 respectively communicating with opposite ends of the rotor chamber 12 and with opposite ends of successive ones of the intervane spaces 15 as the rotor rotates in the chamber. In the particular construction illustrated, the inlet port 31 is formed in the end wall 20 of the housing while the outlet port 32 is formed in the end wall 21. Communicating with the inlet port 31 is an inlet duct or tube 33 and communicating with the outlet port 32 is an outlet duct or tube 34. A continuous stream of air under pressure is delivered to the inlet port 31 through the inlet duct 33, the latter being connected to a suitable source of compressed air. The air pressure may be of the order of 5 to 7 lbs. per square inch, for example, although other values may be used also. As will be apparent, rotation of the rotor 13, which may be driven by any suitable means, not shown, connected to the shaft 24, brings successive intervane spaces 15 into registry with the inlet and outlet ports 31 and 32 so that air flows from the inlet port 31 through the successive intervane spaces and into the outlet port 32 leading to the outlet duct 34. Thus, any flour, or other material, contained in the intervane spaces 15 is pneumatically displaced from successive intervane spaces into the outlet duct 34, which leads to a suitable point of use or disposal, the manner in which the flour, or other material, is introduced into the intervane spaces being considered in the following paragraphs.

The housing 11 is provided with a supply opening 37 for flour, or other material, which is located adjacent the end wall 21 of the rotor chamber 12 and which extends longitudinally of the rotor chamber toward the end wall 20, the length of the supply opening 37 preferably being as nearly equal to the length of the rotor chamber 12 as possible. Adjacent the other end wall 20 of the rotor chamber 12 is a vent opening 38, which occupies the space between the end wall 20 and the supply opening 37. The housing 11 is provided with a flange 39 surrounding the supply and vent openings 37 and 38 and bolted, or otherwise secured, to the flange 39 around the supply opening 37 is a flanged member 40 at the bottom of a hopper, storage bin, or the like, identified by the numeral 41. Similarly bolted, or otherwise secured to, the flange 39 around the vent opening 38 is a flanged member 42 on a vent duct 43 which leads to a suitable point of disposal. Preferably, the vent duct 43 discharges into the top of the storage bin 41 so that any flour, or other material, escaping through the vent duct is discharged back into the bin.

As best shown in Fig. 1 of the drawings, the supply and vent openings 37 and 38 are provided with leading edges 47 and 48, respectively, i. e., they are provided with edges 47 and 48 which are traversed by each intervane space 15 as it begins to communicate with the supply and vent openings. Thus, the edges 47 and 48 have a leading relationship with respect to the intervane spaces 15 as compared to the other edges of the supply and vent openings, hence the term "leading edges." The leading edge 48 of the vent opening 38 is spaced circumferentially of the rotor chamber 12 from the leading edge 47 of the supply opening 37, with reference to the intervane spaces 15, in a direction opposite to the direction 49 of rotation of the rotor 13 so that one end of each intervane space traverses the leading edge 48 of the vent opening 38 and communicates with the vent opening before the other end thereof traverses the leading edge 47 of the supply opening 37 and communicates with the supply opening 37. Expressed somewhat differently, there is a circumferential overlap of the supply and vent openings 37 and 38 with the leading edge 48 of the vent opening in advance of the leading edge 47 of the supply opening 37, again with reference to the intervane spaces 15, so that each intervane space communicates with the vent opening before it communicates with the supply opening. It will be noted that it is necessary to consider the relative circumferential locations of the leading edges 47 and 48 of the supply and vent openings 37 and 38 with reference to the intervane spaces 15 since, while the leading edge 48 is actually spaced circumferentially from the leading edge 47 in a direction opposite to the direction of rotation 49 of the rotor 13 in the particular embodiment under consideration wherein the intervane spaces 15 are parallel to the axis of rotation A—A of the rotor, this might not be the case with helical vanes 14 and intervane spaces 15. For example, if helical vanes and intervane spaces sloping from the lower left corner of Fig. 1 to the upper right corner thereof were employed, the leading edge of the vent opening might actually be spaced circumferentially from the leading edge of the supply opening in the direction of rotation of the rotor in a structural sense, but still be spaced circumferentially from the leading edge of the supply opening in a direction opposite to the rotor when considered in relation to the intervane spaces. Consequently, it is necessary to consider the relative locations of the leading edges 47 and 48 with reference to the intervane spaces 15, and not with reference to their actual structural locations relative to the rotor chamber 12. In other words, so long as each intervane space traverses the leading edge 48 of the vent opening 38 before it traverses the leading edge 47 of the supply opening 37, the leading edge 48 of the vent opening is regarded as being spaced circumferentially from the leading edge 47 of the supply opening in a direction opposite to the direction of rotation of the rotor irrespective of the actual structural locations of the leading edges relative to the rotor chamber.

The supply and vent openings 37 and 38 are also provided with trailing edges 51 and 52 which each intervane space 15 traverses as it moves out of communication with the supply and vent openings. In the case of the trailing edges 51 and 52, the situation is the reverse of that discussed above in connection with the leading edges 47 and 48, i. e., the trailing edge 52 is spaced circumferentially from the trailing edge 51 in the direction of rotation of the rotor 13, and not in a direction opposite to the direction of rotation thereof. Thus, each intervane space communicates with the vent opening 38 before it begins to communicate with the supply opening 37, and continues to communicate with the vent opening after it ceases to communicate with the supply opening. In other words, again with reference to the intervane spaces, the vent opening 38 extends circumferentially beyond the supply opening 37 in both directions.

As best shown in Fig. 1 of the drawings, the leading edge 47 of the supply opening 37 is inclined relative to the axis of rotation A—A of the rotor 13, and relative to the vanes 14 and the intervane spaces 15, in such a way that the end of each intervane space 15 which is farthest from the vent opening 38 communicates with the supply opening before any other portion of such intervane space communicates with the supply opening, the inclined relationship of the leading edge 47 to the intervane spaces resulting in progressive communication of each intervane space with the supply opening in a direction toward the vent opening. Describing the relation between the leading edge 47 and the intervane spaces 15 in more structural language, the leading edge of the supply opening makes acute angles with the intervane spaces and these acute angles face that end of the rotor chamber 12 which is farthest from the vent opening 38, i. e., these acute angles face away from the vent opening. The leading edge 47 of the supply opening 37 has sloping upwardly therefrom a baffle surface 55 which intersects a side wall 56 of the supply opening 37 along a line 57. As best shown in Fig. 4 of the drawings, the leading edge 47 of the baffle surface 55 is formed by a pyramidal baffle 58 of generally triangular cross section which fits into one side of the supply opening 37, this baffle having a cylindrical surface 59 which forms part of the peripheral wall of the rotor chamber 12.

Considering the operation of the valve 10, it will be assumed that the storage bin 41 contains flour, or other material, and that air under pressure is being supplied to the inlet duct 33. In order to start the delivery of flour to the outlet duct 34, rotation of the rotor 13 is initiated, this rotor being driven in any suitable manner, not shown. As successive intervane spaces 15 containing flour communicate with the inlet and outlet ports 31 and 32, the air under pressure in the inlet duct 33 blows the flour out of the intervane spaces into the outlet duct 34, which conveys the flour to a suitable point of disposal or use. Because of the fact that air under pressure is used to clear the intervane spaces 15, each intervane space traps air under pressure therein as it moves out of communication with the inlet and outlet ports 31 and 32. However, as each intervane space 15 containing such trapped air under pressure moves toward the supply and vent openings 37 and 38, it first traverses the leading edge 48 of the vent opening 38 to release the trapped air, thereby reducing the air pressure therein at least substantially to atmospheric pressure. After the air pressure in each intervane space 15 has been reduced from superatmospheric substantially to atmospheric in this manner by first connecting the intervane space to the vent opening 38, the opposite end of the intervane space begins to communicate with the supply opening 37. The communication with the supply opening is, as discussed above, progressive in a direction toward the vent opening so that the end of each intervane space which is farthest from the vent opening fills with flour first, the filling of each intervane space with flour also being progressive in a direction toward the vent opening because of the angular relation between the leading edge 47 of the supply opening and the intervane spaces. This progressive filling of the intervane spaces with flour in a direction toward the vent opening results in progressive displacement of the air under atmospheric pressure in each intervane space toward the vent opening, such displacement of the atmospheric air being produced by the flour itself as it drops into each intervane space in this progressive manner. Consequently, each intervane space is substantially completely filled because of the scavenging of the air under atmospheric pressure through the vent opening 38.

Consequently, since each intervane space 15 is substantially completely filled with flour as a result of the scavenging of both the air under superatmospheric pressure and the air under atmospheric pressure, the valve operates at substantially its maximum volumetric capacity, which is an important feature of the invention. As hereinbefore indicated, in prior valves, wherein no provision for scavenging the air under atmospheric pressure is made and wherein the air under superatmospheric pressure is released at a point in advance of the supply opening, either the capacity of the valve is materially diminished, or the flour in the storage bin is aerated, or both. The valve 10 eliminates these disadvantages of prior valves, which is an important feature of the invention.

Considering the embodiment of Figs. 5 and 6 of the drawings, the same reference characters have been employed to designate corresponding components, except that the subscript "a" has been added thereto. In the valve 10a, the desired angular relation between the intervane spaces 15a and the leading edge 47a of the supply opening 37a has been obtained by employing helical vanes 14a and intervane spaces 15a and by making the leading edge 47a parallel to the axis of rotation of the rotor 13a. In order to maintain the same relation between the leading edges 47a and 48a and the trailing edges 51a and 52a as obtains in connection with the leading edges 47 and 48 and the trailing edges 51 and 52, the vent opening 38a has been offset circumferentially of the rotor chamber 12a relative to the supply opening 37a, the angle of the offset of the vent opening 38a relative to the supply opening 37a depending on the spirality of the vanes 14a. The operation of the valve 10a is identical to that of the valve 10 and will not be described in detail.

Although I have disclosed exemplary embodiments of my invention herein for purposes of illustration and have discussed an exemplary application thereof, it will be understood that the invention is susceptible to other applications and that various changes, modifications and substitutions may be incorporated in the embodiments disclosed without departing from the spirit of the invention.

I claim as my invention:

1. In a valve, the combination of: a cylindrical housing; a rotor in said housing having a plurality of radial vanes extending from one longitudinal end to the other of said housing providing a plurality of intervane spaces; said housing being provided in its cylindrical wall portion with an opening extending from said one to said other end of said housing; walls bounding the marginal edges of said opening providing a passageway communicating with said intervane spaces through said opening; a partition in said passageway extending transversely with respect to the longitudinal axis of said cylindrical housing and having its inner edge closely following the peripheral envelop of said rotor whereby to divide said opening into respective longitudinally adjacent vent and supply openings; the extent of said supply and vent openings transversely of the axis of rotation of said rotor and their disposition with respect to each other being such that as said rotor rotates said vent opening communicates with each successive intervane space prior to communication of said supply opening with the same intervane space and remains in communication therewith at least until communication between the supply opening and the same intervane space is cut off by rotation of the rotor whereby a material entering each intervane space through said supply opening displaces air therefrom through said vent opening throughout communication of said supply opening with each intervane space, and said housing being provided with apertured outlet means in remote spaced relation with respect to said vent and supply openings for communication with successive ones of said intervane spaces as said rotor rotates in said housing.

2. In a valve, the combination of: a cylindrical housing; a rotor in said housing having a plurality of radial vanes extending from one longitudinal end to the other of said housing providing a plurality of intervane spaces; said housing having therein inlet and outlet ports respectively opening into opposite ends of said housing and into opposite ends of successive ones of said intervane spaces as said rotor rotates in said housing; said housing also being provided in its cylindrical wall portion remote from said ports with an opening extending from said one to said other end of said housing; walls bounding the marginal edges of said opening providing a passageway communicating with said intervane spaces through said opening; a partition in said passageway extending transversely with respect to the longitudinal axis of said cylindrical housing and having its inner edge closely following the peripheral envelop of said rotor whereby to divide said opening into respective longitudinally adjacent vent and supply openings; the extent of said supply and vent openings transversely of the axis of rotation of said rotor and their disposition with respect to each other being such that as said rotor rotates said vent opening communicates with each successive intervane space prior to communication of said supply opening with the same intervane space and remains in communication therewith at least until communication between the supply opening and the same intervane space is cut off by rotation of the rotor whereby a material entering each intervane space through said supply openings displaces air therefrom through said vent opening throughout communication of said supply opening with each intervane space.

3. In a valve, the combination of: a cylindrical housing; a rotor in said housing having a plurality of radial vanes extending from one longitudinal end to the other of said housing providing a plurality of intervane spaces; said housing having therein inlet and outlet ports respectively opening into opposite ends of said housing and into opposite ends of successive ones of said intervane spaces as said rotor rotates in said housing; said housing also being provided in its cylindrical wall portion remote from said ports with an opening extending from said one to said other end of said housing; walls bounding the marginal edges of said opening providing a passageway communicating with said intervane spaces through said opening; a partition in said passageway extending transversely with respect to the longitudinal axis of said cylindrical housing and having its inner edge closely following the peripheral envelop of said rotor whereby to divide said opening into respective longitudinally adjacent vent and supply openings; said supply and vent openings respectively having leading edges which said intervane spaces traverse as they rotate into communication with said supply and vent openings, said leading edge of said vent opening being spaced circumferentially from said leading edge of said supply opening, with reference to said intervane spaces, in a direction opposite to the direction of rotation of said rotor so that said other end of each intervane space traverses said leading edge of said vent opening and communicates with said vent opening before said one end thereof traverses said leading edge of said supply opening and communicates with said supply opening, and the extent of said supply and vent openings from leading to trailing edges being such that said vent opening remains in communication with each respective intervane space at least until each said respective intervane space has traversed the trailing edge of said supply opening.

4. A valve according to claim 3 wherein said leading edge of said supply opening makes acute angles with said intervane spaces, said acute angles facing said one end of said rotor housing so that said intervane spaces communicate progressively with said supply opening in a direction from said one end of said rotor housing remote from said vent opening toward said other end thereof proximate said vent opening.

5. A valve according to claim 4 wherein said intervane spaces are parallel to the axis of rotation of said rotor and wherein said leading edge of said supply opening makes an acute angle with the axis of rotation of said rotor.

6. A valve according to claim 5 including a baffle surface sloping upwardly from said leading edge of said supply opening.

7. A valve according to claim 4 wherein said leading edge of said supply opening is parallel to the axis of rotation of said rotor and wherein said intervane spaces are inclined relative to the axis of rotation of said rotor.

References Cited in the file of this patent

UNITED STATES PATENTS

| 585,804 | Weber | July 6, 1897 |
| 941,024 | Mantius | Nov. 23, 1909 |
| 1,321,262 | Townsend | Nov. 11, 1919 |
| 1,541,087 | Whitaker | June 9, 1925 |
| 1,779,264 | Seehusen | Oct. 21, 1930 |
| 2,652,687 | Yellott | Sept. 22, 1953 |

FOREIGN PATENTS

| 572,199 | Germany | Jan. 15, 1932 |